April 6, 1954
A. L. ROBB
2,674,466
WHEEL GUIDE, WHEEL CHOCK, AND HOLD-DOWN FOR
VEHICLES TRANSPORTING WHEELED CONTAINERS
Filed March 13, 1950
2 Sheets-Sheet 1
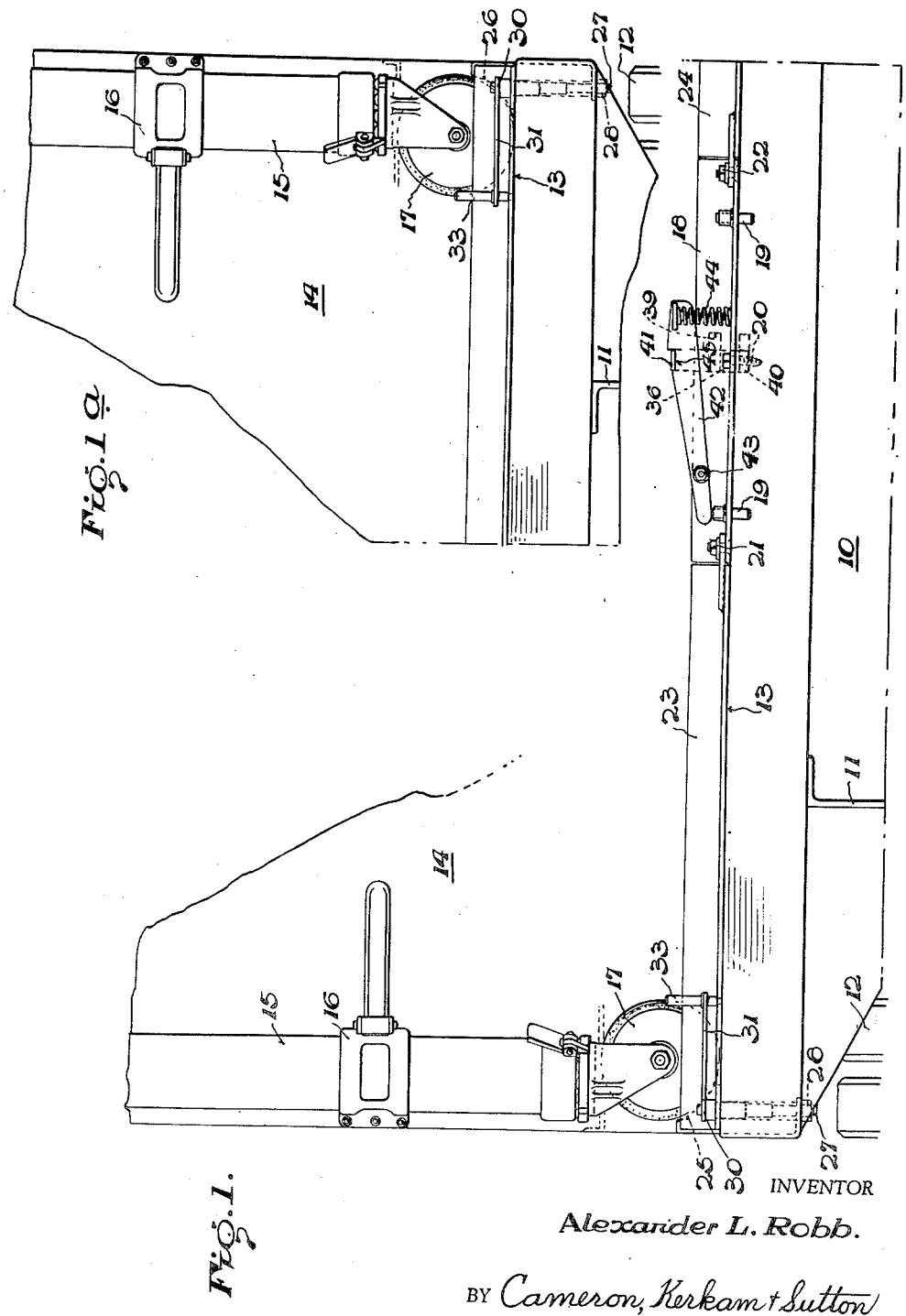
INVENTOR
Alexander L. Robb.
BY Cameron, Kerkam + Sutton
ATTORNEYS

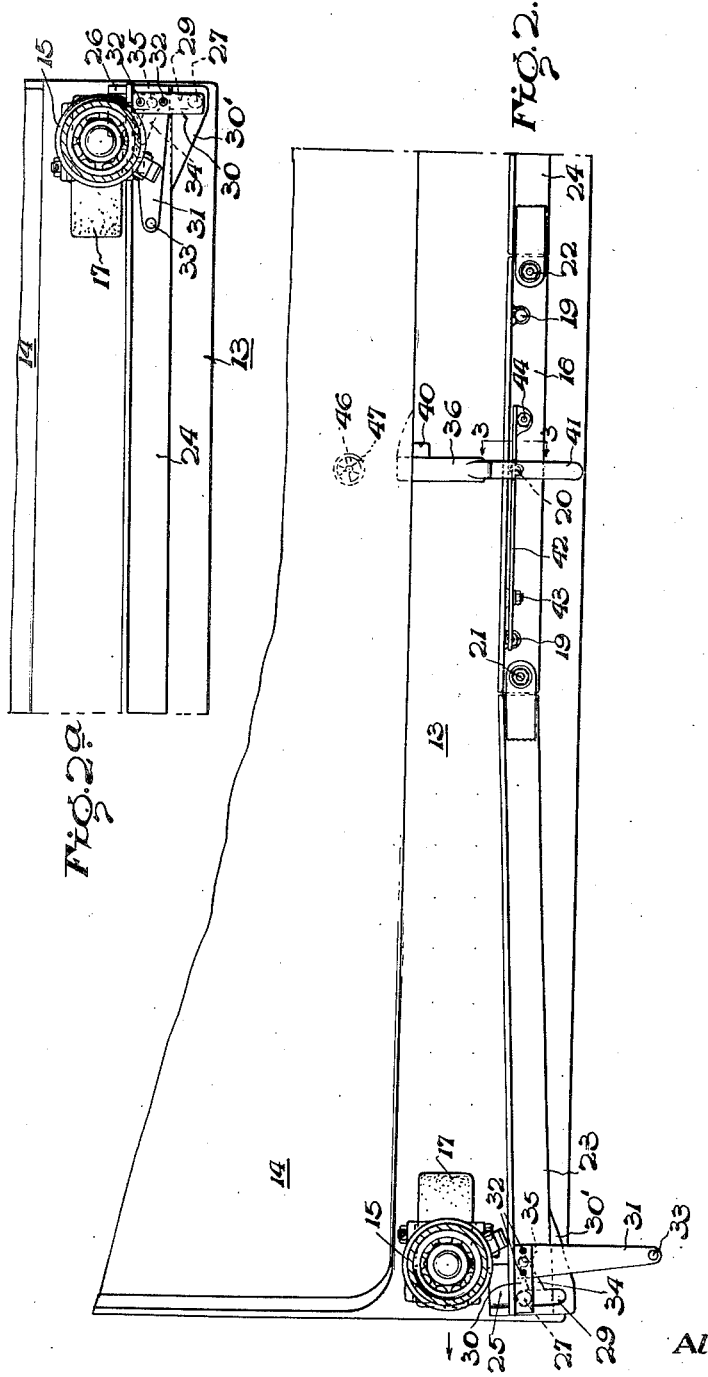

Patented Apr. 6, 1954

2,674,466

UNITED STATES PATENT OFFICE 2,674,466

WHEEL GUIDE, WHEEL CHOCK, AND HOLD-DOWN FOR VEHICLES TRANSPORTING WHEELED CONTAINERS

Alexander L. Robb, Redwood City, Calif., assignor to Hodges Research and Development Company, Redwood City, Calif., a corporation of California Application March 13, 1950, Serial No. 149,239

9 Claims. (Cl. 280—179)

This invention relates to novel wheel guides, wheel chocks, and hold downs in combination and more particularly to such combinations particularly suitable for use with wheeled less than carload lot containers. More particularly still this invention relates to such combinations particularly suited for use with means of transportation for wheeled less than carload lot containers to guide the wheels of the same during transfer of the containers and to provide chocks for the wheels to prevent overrunning of the containers while at the same time providing a novel hold down for securing the less than carload lot containers to the transporting means when the less than carload lot containers are resting thereon.

In the pending application of William C. Hodges and Alexander L. Robb, Serial No. 124,592, filed October 31, 1949, now Patent No. 2,635,430, there is disclosed and claimed a novel system and mechanism for transferring wheeled less than carload lot containers from one means of transportation to another and, as illustrated therein, such means of transportation may include, among others, a truck and a railroad flat car. When transferring such wheeled less than carload lot containers from one means of transportation to another, as from a railroad flat car to a truck, it may sometimes be desirable to provide wheel guides on one or the other or on both of the means of transportation to guide the wheels of the container during motion thereof. It may also be desirable to provide such wheel guides with wheel chocks to arrest movement of the wheels at a limit of motion of the container to prevent overrunning of the container and to prevent the same from running off of one of the transportation means. Since transfer of the less than carload lot container must be possible from either side of the transportation means such wheel chocks must be arranged for disengagement from the wheels to permit transfer in either direction. When the less than carload lot container is resting upon its bottom on a transportation means it is desirable to prevent vertical movement of the same during transportation and a hold down for the less than carload lot container may be employed near the guide rail.

The present invention provides a novel combination of wheel guide, wheel chock, and hold down in which manually actuated means are provided for moving the chocks from wheel engaging position and in which a removable hold down for the less than carload lot container is provided which may be secured in place adjacent to the wheel guide.

It is accordingly an object of the present invention to provide a novel manually actuated wheel guide, wheel chock, and hold down in combination particularly suited for use in the transfer of less than carload lot wheeled containers.

Another object is to provide such a novel combination in which manually actuated cam means are provided to move the chocks from adjacent the wheels of a less than carload lot container to permit transfer of the same from either side of the container transportation means.

Another object is to provide such a novel combination in which the removable hold down for the less than carload lot container when in hold down position may be adjacent to the guide rail and is utilized in combination with means for preventing horizontal movement of the container.

Another object is to provide such a novel combination which is of simple construction and which may be readily installed upon any means of transportation without requiring major structural modification thereof.

Other and further objects of the present invention will appear from the following description.

The present invention is capable of various mechanical embodiments one of which is disclosed in the accompanying drawing and is described hereinafter for the purpose of illustrating the same. This illustrative embodiment should in no way be construed as defining or limiting my invention and reference should be had to the appended claims for this purpose.

In the accompanying drawings, in which like reference characters indicate like parts, one embodiment of my invention is there shown as applied to a truck for transporting the less than carload lot container which container will hereinafter be referred to, for convenience, as a van, and Fig. 1 is a rear view of a part of a conventional truck showing an embodiment of my novel guide rail, wheel chock and hold down applied thereto and showing a portion of the wheeled van to be transported by the truck;

Fig. 1a is a continuation of Fig. 1 showing the right hand portion of the embodiment of Fig. 1;

Fig. 2 is a view from above of that portion of the embodiment of the present invention shown in Fig. 1;

Fig. 2a is a view from above of that portion of the embodiment of the present invention shown in Fig. 1a; and Fig. 3 is a side view of a portion of the van and truck to show in detail the hold down of the present invention and a means for locking the same in place associated with the guide rail.

Referring now to the several figures, any suitable means such as a truck for transporting the van is generally indicated at 10 and includes any suitable framing 11 supported by wheels 12 and is provided with a conventional deck 13. A less than carload lot container or van is generally shown at 14, and as described in the copending application identified above, includes cylinders 15 secured at each corner thereof as by brackets 16. A piston is mounted in each of cylinders 15 and this piston, which is not shown, is suitably secured to castering wheels 17 to raise and lower the same. When these pistons are actuated to lower wheels 17 van 14 is raised and the weight of the same rests entirely upon the wheels 17 to place the van in condition for transfer. When the pistons and cylinders 15 are actuated to raise wheels 17 the van 14 is lowered and will rest upon its bottom.

Since vans 14 when loaded are extremely heavy and since the forces required to transfer the same are necessarily large it follows that it may be desirable to provide guides for the castering wheels 17 on the truck 10 to prevent movement of the container 14 in an undesirable direction and to also provide chocks to stop movement of wheels 17 to prevent the van from overrunning the truck. A wheel guide should be provided for each end of the container and should run transversely of the truck. One such guide only is shown for clarity in these drawings. The wheel guide is seen to comprise a straight L-shaped length of guide rail 18 suitably secured to deck 13 of truck 10 as by pins 19 and lags 20. A vertical pivot 21 is provided at one end of rail 18 and a similar pivot 22 is provided at the other end. A suitable length of L-shaped rail 23 is mounted for pivotal movement on pivot 21 and a similar length of rail 24 is pivotally mounted for movement on pivot 22. Rails 23 and 24 terminate adjacent the sides of truck 10. A wheel chock 25 is mounted upon the outer end of guide 23 and a similar wheel chock 26 is mounted upon the outer end of guide 24.

Guides 23 and 24 are rotatable about pivots 21 and 22 respectively to move wheel chocks 25 and 26 into and out of engagement with wheels 17 by a manually actuated cam means seen in detail in Figs. 2 and 2a. In Fig. 2 the cam means has been actuated to remove chock 25 from adjacent wheel 17 and in Fig. 2a the cam means is positioned to place chock 26 in position for engagement by wheel 17. The manually actuated cam means for moving guides 23 and 24 includes a pivot 27 passing through deck 13 and secured in position by nut 28. Pivot 27 passes through a suitable slot 29 formed in the bottom of the guide 23 or 24 and this slot may be extended into a suitable gusset 30' secured to the edge of the track element 23 or 24 when the required throw of the chock is longer than the width of the base of the guide. An arm 30 is mounted for rotation on the top of pivot 27 and a crank arm 31 is secured at right angles thereto as by bolts 32. A suitable handle 33 may be mounted on lever 31. A second groove 34 is cut in the base of track element 23 or 24 at an angle as shown to groove 29 and a cam pin 35 is secured to arm 30 beneath lever 31 for engagement in this groove. When lever 31 is rotated about pivot 27 in a counterclockwise direction as seen in Fig. 2 pin 35 will slide in groove 34 and will rotate element 23 about pivot 21 in a clockwise direction to bring chock 25 into position for engagement by the adjacent wheel 17. The slot 29 permits rotation of the track element without interference by pivot 27. When the track has been rotated into position adjacent the wheel 17 the cam mechanism for rotating the track element is in locked position, as will be seen in Fig. 2a, because of the alignment of pivot 27 and cam pin 35 and lever 31 must be positively actuated to move the chock from its position adjacent the wheel.

The hold down employed to secure the van against vertical movement with respect to the truck 10 comprises a fork shaped element 36 having upper and lower tines 37 and 38. An opening 39 is formed in the van 14 adjacent and above the bottom thereof and a corresponding opening 40 is provided in and beneath the deck 13 of the truck 10. When member 36 is in position upper tine 37 will engage a portion of the bottom of the van 14 and the tine 38 will engage a suitable portion of the underside of the deck 13 of the truck 10 to lock the same together. Element 36 is provided with an offset handle 41 which when element 36 is in locking position extends outwardly over the top of guide 18 in close proximity thereto. A latch 42 is pivoted at 43 to guide 18 and is urged upwardly by spring 44. A notch 45 is provided in latch 42 to engage handle 41 and when handle 41 is engaged by notch 45 element 36 is secured in locking position. Latch 42 may be manually depressed against the action of spring 44 to free arm 41 and element 36 may then be removed from locking position.

Suitable means for preventing horizontal movement of the container should be employed for cooperation with the hold downs such as conical centering pins 46, one of which is shown in Fig. 2, may be mounted upon deck 13 of truck 10 and holes 47 for cooperation therewith may be formed in the bottom of container 14. When container 14 is lowered to rest upon deck 13 after transfer and after wheels 17 have engaged the chocks to stop their motion in transfer the conical pins 46 will enter holes 47 and accurately center the container 14 with respect to the truck 10 and move the wheels 17 sufficiently to clear the chocks to permit movement thereof by the cam means above described.

It will now be apparent to those skilled in the art that by the present invention I have provided a novel combination of wheel guide, wheel chock and van hold down in which the wheel chock may be readily moved out of position adjacent the wheels of the van by manually operable cam means to permit transfer of the wheeled van in either direction laterally of the transportation means and which in every way satisfies the objectives described above.

Changes in or modifications to the above described illustrative embodiment of my invention may now be apparent to those skilled in the art. For example any other suitable means may be employed in place of the described cam actuated means for moving the chocks into and out of position for wheel engagement. Reference should therefore be had to the appended claims to determine the scope of this invention.

What is claimed is:

1. In a guide rail as described including a supporting surface for a wheeled container, a guide rail fixed to the supporting surface, a second guide rail forming an extension of and moveably mounted on one end of said first named guide rail, a third guide rail forming an extension of and moveably mounted on the other end of said first named guide rail, wheel chocks mounted at the outer ends of said second and third named guide rails and separate means associated with each of said second and third named guide rails for moving said wheel chocks into and out of wheel engaging position.

2. In a guide rail as described in claim 1, a latch pivoted for vertical rotation on said first named guide rail, resilient means urging said latch in an upward direction, and a fork engaging the container and the supporting surface and held in position by said latch.

3. A guide rail as described in claim 1 in which said separate means include a pivot mounted adjacent the outer end of the rotatable rail, a lever mounted on said pivot for horizontal rotation, a cam slot formed in and adjacent to the outer end of the rotatable rail and a pin carried by said lever and engaging said cam slot whereby when said lever is rotated said pin will move in said slot and rotate the moveable rail to move said wheel chocks into and out of wheel engaging position.

4. A guide rail as described in claim 3 in which said rails are L-shaped in cross section with the base of the L in contact with the supporting surface and in which said cam slot is formed in the base of the L.

5. A guide rail as described in claim 4 in which said chocks are mounted on the upstanding surface of the moveable rails on the side opposite said cam slots.

6. In the combination as described including a supporting surface and a moveable container, guide rails secured to the surface guiding the container during movement, forks engaging the container and the supporting surface and extending over said rails, and latches carried by said rails and engaging said forks.

7. In the combination as described including a supporting surface and a moveable container, guide rails secured to the surface guiding the container during movement, chocks pivoted for horizontal movement on the ends of said guide rails and means for moving said chocks into and out of the line of movement of the container including for each chock a lever pivoted on said surface, a cam groove formed on said chock and a pin carried by said lever and engaging said groove.

8. In the combination as described including a supporting surface and a moveable container, guide rails secured to the surface guiding the container during movement, chocks pivoted for horizontal movement on the ends of said guide rail, a lever for each chock pivoted to the surface, cam means actuated by each lever for rotating the associated chock into and out of the line of movement of the container, latches carried by said rails and forks holding the container to the supporting surface locked in position by said latches.

9. In a guide rail as described including a supporting surface for a wheeled container, a guide rail mounted on the supporting surface, guide rail extensions pivoted at each end of said guide rail, wheel chocks mounted on the outer ends of said guide rail extensions and means for moving said chocks into and out of position for engagement with the wheels.

References Cited in the file of this patent

UNITED STATES PATENTS

| Number | Name | Date |
|---|---|---|
| 1,101,883 | Rochford | June 30, 1914 |
| 1,803,942 | Lunati | May 5, 1931 |
| 1,862,632 | Perin | June 14, 1932 |
| 1,883,538 | Bywater | Oct. 18, 1932 |
| 2,047,954 | Fitch | July 21, 1936 |
| 2,047,955 | Fitch | July 21, 1936 |
| 2,079,992 | Gonzalez | May 11, 1937 |
| 2,351,314 | Ario | June 13, 1944 |
| 2,419,110 | Binney | Apr. 15, 1947 |
| 2,478,578 | Gottshall | Aug. 9, 1949 |